United States Patent [19]

Tsukahara

[11] Patent Number: 4,879,639
[45] Date of Patent: Nov. 7, 1989

[54] POWER CONVERTER FOR DRIVING AN AC MOTOR AT A VARIABLE SPEED

[75] Inventor: Takashi Tsukahara, Kawasaki, Japan
[73] Assignee: Fuji Electric Co., Ltd., Kawasaki, Japan
[21] Appl. No.: 192,313
[22] Filed: May 10, 1988
[30] Foreign Application Priority Data May 11, 1987 [JP] Japan ............................. 62-113955

[51] Int. Cl.$^4$ ............................................. H02M 5/45
[52] U.S. Cl. ....................................... 363/37; 318/803
[58] Field of Search ............... 318/759, 803, 806, 812; 363/37, 96

[56] References Cited

U.S. PATENT DOCUMENTS

| | | | |
|---|---|---|---|
| 4,272,807 | 6/1981 | Gallagher | 363/37 |
| 4,328,454 | 5/1982 | Okuyama et al. | 363/37 |
| 4,375,612 | 3/1983 | Wirth | 318/803 |
| 4,434,393 | 2/1984 | Kobari et al. | 318/757 |
| 4,567,555 | 1/1986 | Matsuse et al. | 363/37 |
| 4,620,272 | 10/1986 | Fulton et al. | 318/806 |
| 4,670,827 | 6/1987 | Schneider | 318/803 |
| 4,697,131 | 9/1987 | Schauder et al. | 318/803 |
| 4,720,776 | 1/1988 | Guyeska et al. | 363/37 |
| 4,788,635 | 11/1988 | Heinrich | 363/37 |
| 4,805,082 | 2/1989 | Heinrich et al. | 363/37 |

OTHER PUBLICATIONS

Fuji Electric Journal, vol. 58, No. 4, 1985, pp. 275-278.

Primary Examiner—Patrick R. Salce
Assistant Examiner—Jeffrey Sterrett
Attorney, Agent, or Firm—Spencer & Frank

[57] ABSTRACT

A power converter having a thyristor converter connected to an AC power source to rectify its AC output, a DC intermediate circuit including a smoothing capacitor and receiving a rectified output from the thyristor rectifier and a voltage type inverter for converting a DC voltage applied from the DC intermediate circuit into an AC output voltage of a variable voltage and a variable frequency. The DC intermediate circuit has two series circuits, each having a diode and a transistor switch, connected in parallel with each other and to the both terminals of the thyristor converter. The junctions, each between the diode and the resistor, are connected to the both terminals of the smoothing capacitor. The two series circuits function to switch the connection polarities of the thyristor converter and the smoothing capacitor and to regulate the voltage across the capacitor with a limited current by a voltage step-up or step-down operation by the transistor switch.

9 Claims, 5 Drawing Sheets

POWER CONVERTER FOR DRIVING AN AC MOTOR AT A VARIABLE SPEED

BACKGROUND OF THE INVENTION

1. Field of the Invention

The present invention relates to a power converter for driving a motor at a variable speed, having a rectifier connected to an AC power source and a voltage type inverter for inverting a DC voltage, which is supplied through a DC intermediate circuit including a smoothing capacitor from the rectifier, produce an AC voltage having a variable frequency and a variable voltage which is supplied to an AC motor.

2. Description of the Prior Art

With the power converter of the type described above, the AC motor is pulled into power generation operation under the control of the voltage type inverter to perform braking operation. In this case, the kinetic energy of the motor and a load is converted into an electrical energy by the motor, and the electrical energy is returned via the inverter to the DC intermediate circuit. Therefore, in order to limit a voltage rise across the smoothing capacitor in the DC intermediate circuit within an allowable range, it is required to Process the electrical energy.

In order, to process the electrical energy efficiently, while avoiding an undesired consumption of the power, it is well known in the art that the electric energy returned to the DC intermediate circuit is regenerated into the AC power source during the braking operation of the motor. In this case, if a thyristor converter is provided as a rectifier for feeding an electric power to the DC intermediate circuit during the driving operation of the motor, and the thyristor converter is used for the regeneration during braking operation of the motor, another thyristor converter exclusively for the sake of the regeneration can be eliminated. In this case, in order to ensure that the voltage polarities of the smoothing capacitor remain unchanged even during the driving operation and the regenerative braking operation of the motor, there is provided means for switching the polarities of the connection between the smoothing capacitor and the thyristor converter.

Figure 9:
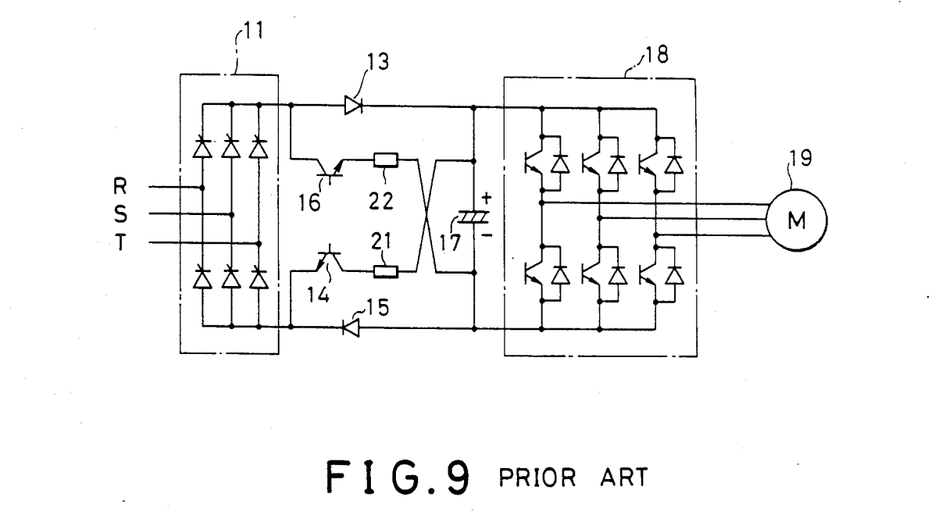
FIG. 9 is a circuit diagram showing an example of a prior art power converter.

FIG. 9 shows a conventional power converter for driving a motor at a variable speed, provided with the switching means of the type described above.

In this power converter, the DC terminals of a thyristor converter 11, which are connected to three phase lines R, S and T of a three phase AC power source, are connected through diodes 13 and 15 to a smoothing capacitor 17, respectively. A voltage type inverter 18 connected to the smoothing capacitor 17 is formed by a three phase bridge connection of transistors to which diodes are connected in parallel, respectively, to supply an AC voltage of a variable frequency and a variable voltage to an AC motor 19. Furthermore, the thyristor converter 11 and the smoothing capacitor 17 are connected through a series circuit of a transistor 14 and a resistor 21 on one hand and through a series circuit of a transistor 16 and a resistor 22 on the other hand in such a way that the thyristor converter 11 and the smoothing capacitor 17 are connected to each other in reversed polarity with respect to the connections of the diodes 13 and 15.

With this arrangement, in the case of driving operation, the electric power is fed from the AC power source through the thyristor converter 11 and the diodes 13 and 15 to the smoothing capacitor 17 by the forward conversion operation accomplished by the thyristor 11 and then further fed to the AC motor 10 from the smoothing capacitor 17 through the inverter 18.

In the case of braking operation, the electric energy is returned to the smoothing capacitor 17 from the AC motor 19 through the inverter 18 and excess energy stored in the smoothing capacitor 17 is regenerated to the AC power source through the resistors 21 and 22, transistors 14 and 16 and the thyristor converter 11 by the reverse conversion operation of the thyristor converter 11.

In this conventional converter, the transistors 14 and 16 are maintained in the conduction state in the case of braking operation, and the regenerative current flowing through the transistors 14 and 16 is adjusted by the phase control by the thyristor converter 11. In the case of the driving operation, in order to attain a high voltage availability of the thyristor converter 11, the forward conversion operation of the thyristor converter 11 is carried out at a firing angle of lag substantially equal to zero, so that the same maximum output voltage can be produced as that in the case of a diode rectifier. On the other hand, in the reverse conversion operation of the thyristor converter 11 in the case of the braking operation, in order to avoid commutation failure, a suitable commutation margin angle must be secured. For this purpose, a maximum possible reverse voltage obtained across the DC terminals of the thyristor converter 11 is lower than the maximum output voltage obtained in the above-mentioned forward conversion operation. Therefore, in the case of the braking operation, the maximum possible reverse voltage from the thyristor 11 is lower than the voltage across the smoothing capacitor 16. The regenerative current flowing through the transistors 14 and 16 would be out of control and thus dissipated without the provision of the resistor 21 and 22, so that the transistors 14 and 16 are protected against an overcurrent.

The resistance R ($\Omega$) of each resistor is determined as follows. It is assumed that $E_1$ (V) represents the assumed minimum value of the DC reverse voltage generated by the thyristor converter 11 when the thyristor converter 11 is driven at a predetermined minimum control angle of lead under the consideration of the variations of the power source voltage and it is assumed that $E_2$ (V) represents the assumed maximum value of the voltage across the smoothing capacitor 17. Then, the resistance R ($\Omega$) of the resistor is so determined that the current value (A) given by $(E_2-E_1)/2R\Omega$ remains within a tolerable range for each of the transistors 14 and 16.

In the converter of the type described above, a power loss of $i^2R$(W) (where i represents a generative current [A] flowing through the resistors 21 and 22) is generated in each of the resistors 21 and 22 so that heat is generated. Thus, in the case of the design and production of the power converter for driving a motor at a variable speed, there arises a serious problem in that it is difficult to dissipate the heat generated by the resistors 21 and 22. Because of this problem, it has been difficult to make a power converter compact in size, light in weight and inexpensive to manufacture.

SUMMARY OF THE INVENTION

In view of the above, it is an object of the present invention to provide a power converter for driving a motor at a variable speed, in which the power converter exhibits control performance better than that of a conventional power converter, and has a reduced number of component parts and a low cost.

It is another object of the present invention to provide a power converter for driving a motor at a variable speed in which a regenerated energy is efficiently returned to the power source by keeping the regenerative current out of a dangerous range without the use of the resistors used in conventional power converters, even when the power converter is driven at its maximum output voltage in the case of the driving operation.

In a first aspect of the present invention, a power converter for driving an AC motor at a variable speed, comprises:

a thyristor converter connected to an AC power source for rectifying an AC voltage from the AC power source;

DC intermediate circuit including a smoothing capacitor for charging therein a rectified output from the thyristor converter, a first diode, a second diode, a first semiconductor switch and a second semiconductor switch, first and second DC terminals of the thyristor converter and first and second terminals of the smoothing capacitor being connected to each other through the first and second diodes, respectively, in polarity relationship corresponding to forward conversion by the thyristor converter in the case of driving the AC motor, and the first and the second DC terminals of the thyristor converter and the first and the second terminals of the smoothing capacitor being connected to each other through the first and second semiconductor switches, respectively, in polarity relationship corresponding to reverse conversion by the thyristor converter in the case of braking operation by the AC motor, whereby, in the case of driving the AC motor, one of the first and second semiconductor switches is turned off, while the other semiconductor switch is caused to perform a high frequency switching operation or both of the first and second semiconductor switches are simultaneously interrupted and in the case of the braking operation, one of the first and second semiconductor switches is rendered conductive while the other semiconductor switch is caused to perform a high frequency switching operation;

a voltage type inverter for inverting a DC voltage derived from the smoothing capacitor into an AC voltage having a variable frequency and a variable voltage, the AC voltage being supplied to the AC motor;

a control means for operating the thyristor converter substantially at a predetermined maximum forward conversion output voltage in the case of driving the AC motor, and for operating the thyristor converter substantially at a predetermined maximum reverse conversion output voltage in the case of braking the AC motor; and an inductance element inserted in series into at least one of the AC and DC sides of the thyristor converter.

Here, one terminal of the first diode and one terminal of the main circuit of the first transistor may be connected to each other, and one terminal of the second diode and one terminal of the main circuit of the second transistor may be connected to each other. The other terminal of the first diode and the other terminal of the main circuit of the second transistor may be connected to each other and in common to one terminal of the thyristor converter, and the other terminal of the main circuit of the first transistor and the other terminal of the second diode may be connected to each other and in common to the other terminal of the thyristor converter. The smoothing capacitor may be connected between the one terminal of the first diode and the one terminal of the second diode.

Alternatively, one terminal of the first diode and one terminal of the main circuit of the first transistor may be connected to each other, and one terminal of the second diode and one terminal of the main circuit of the second transistor may be connected to each other. The other terminal of the first diode and the other terminal of the main circuit of the second transistor may be connected to each other and in common to one terminal of the thyristor converter, and the other terminal of the main circuit of the first transistor and the other terminal of the second diode may be connected to each other and in common to the other terminal of the thyristor converter through a reactor. The smoothing capacitor may be connected between the one terminal of the first diode and one terminal of the second diode.

A third diode may be connected between the one terminal of the second diode and the other terminal of the thyristor converter.

A power converter may further comprise:

means for detecting whether or not the voltage across the smoothing capacitor exceeds a predetermined value; and means for controlling the thyristor converter so that the thyristor converter is switched to motor braking operation when the voltage across the smoothing capacitor exceeds the predetermined value.

The control means may comprise:

means for detecting an output current from the thyristor converter;

means for giving a set value of the output current from the thyristor converter;

means for comparing the detected output current with the set value; and current control means for controlling the first and second semiconductor switches in response to a comparison output from the means for comparing in a manner that operations of the first and second semiconductor switches are interrupted when the detected output current is lower than the set value, and that the operations of the first and second semiconductor switches are enabled when the detected output current exceeds the set value, whereby the output current coincides with the predetermined value.

The current control means may comprise:

means for executing proportional integration of the comparison output from the means for comparing; and a pulse width modulation means for generating a pulse output having a pulse width which varies in accordance with a result of the proportional integration, the first and second semiconductor switches being controlled by the pulse output.

The current control means may include a hysteresis comparator which receives the comparison output from the means for comparing and limits the output current within a range between a predetermined upper limit and a predetermined lower limit with respect to the set value.

The means for detecting may have a hysteresis characteristic between a predetermined upper limit and a predetermined lower limit with respect to the predetermined value.

According to the present invention, therefore, in the case of the braking operation, under the control by the high frequency switching operations by semiconductor switches which may be, for instance, transistor switches, the regenerated current which flows through a reactor is increased due to the difference in voltage between the voltage across the smoothing capacitor and the DC reverse voltage across the thyristor converter while both the transistor switches are simultaneously conductive, and on the other hand, while one of the semiconductor switches is interrupted, the current flowing through the reactor drops. These operations are repeated, so that the regenerated current can be returned through the DC intermediate circuit to the AC power source in a safe and efficient manner while maintaining the regenerated current within a desired range.

In this case, the thyristor converter is activated in a manner substantially similar to that of the diode rectifier in the case of the driving operation, so that the maximum forward conversion output voltage is generated. On the other hand, in the case of the braking operation, the maximum reverse conversion output voltage is generated at the predetermined minimum control angle of lag, so that availability of the thyristor converter can be ensured.

The above and other objects, effects, features and advantages of the present invention will become more apparent from the following description of various embodiments thereof taken in conjunction with the accompanying drawings.

DETAILED DESCRIPTION OF THE PREFERRED EMBODIMENTS

Figure 1:
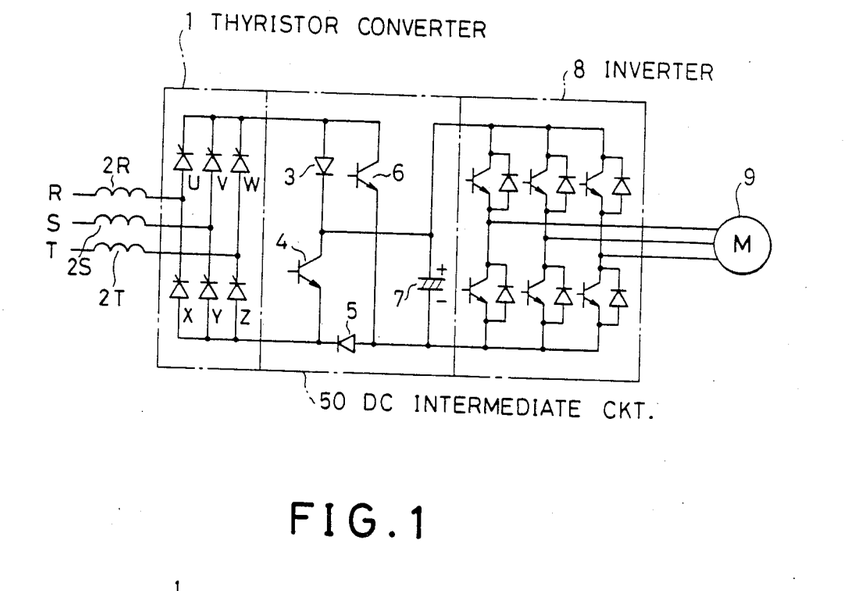
FIG. 1 is a circuit diagram showing one embodiment of a power converter in accordance with the present invention.

FIG. 1 shows an embodiment of a power converter for driving a motor at a variable speed.

Figure 3:
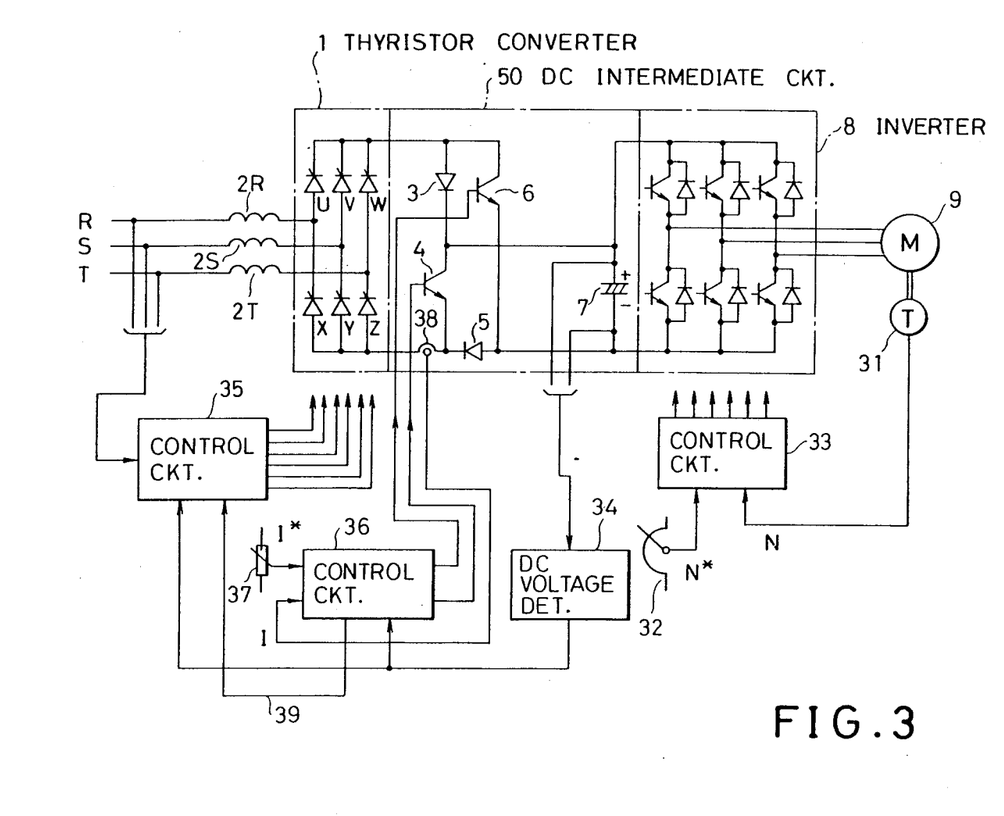
FIG. 3 is a circuit and block diagram showing a further embodiment of a power converter in accordance with the present invention including its control units.

In this embodiment, a thyristor converter 1 having thyristors U-Z connected in the form of a three phase bridge is connected as a rectifier to the three phases R, S and T of an AC power source. A voltage type inverter 8 for supplying a three phase AC voltage having a variable frequency and a variable voltage to an AC motor 9, for instance, a three-phase squirrel-cage induction motor comprises a three phase bridge consisting of transistors (unnumbered) respectively connected in parallel with diodes and is controlled, for instance the form of PWM (pulse width modulation) by, for instance, a conventional vector controller 33 as shown in FIG. 3. A smoothing capacitor 7 is provided in a DC intermediate circuit 50 arranged between the thyristor converter 1 and the voltage type inverter 8. In this case, while the smoothing capacitor 7 and the voltage type inverter 8 are directly connected to each other, the thyristor converter 1 and the smoothing capacitor 7 are connected to each other through the diodes 3 and 5 in polarity relationship corresponding to the forward conversion operation of the thyristor converter 1 during the driving operation and also through semiconductor switches 4 and 6 in polarity relationship corresponding to the reverse conversion operation of the thyristor 1 during the braking operation. These semiconductor switches may be formed by transistor switches. In addition, inductive elements 2R, 2S and 2T are connected in series to the three phases R, S and T, respectively, on the AC side of the thyristor converter 1.

During the driving operation, the firing of the thyristor converter 1 is controlled at a control angle of lag substantially equal to zero to generate a maximum forward conversion output voltage similar to that in the case of a diode rectifier, and during the braking operation its firing is controlled at a predetermined minimum control angle of lead to generate a maximum reverse conversion output voltage. In the case of the driving operation, the transistors 4 and 6 are arranged in either of the following manners depending upon a voltage applied to the voltage type inverter. That is, when the input voltage to the voltage type inverter 8 is equal in level to the maximum forward conversion output voltage from the thyristor converter 1, the transistors 4 and 6 are maintained in the interrupted condition, and when the input voltage to the voltage type inverter 8 is higher than the maximum forward conversion output voltage from the thyristor converter 1, either of the transistors 4 and 6 is driven to perform high frequency switching operation. In the case of the braking operation, the transistors 4 and 6 are controlled to be conductive and in this case, either of the transistors 4 and 6 is driven to perform high frequency switching operation.

First, the driving operation of driving the motor 9 will be described.

The operation when the transistors 4 and 6 are kept interrupted during the driving of the motor 9 is substantially similar to the operation of the apparatus described above with reference to FIG. 3, so that no further explanation shall be made here. Explanation will be made of the case where one of the transistors 4 and 6, for instance, the transistor 4, is driven to carry out the high frequency switching operation, while the other transistor 6 is maintained in the interrupted state, so that the motor 9 is driven.

In the case of driving the motor 9, the firing of the thyristor converter 1 is controlled at a control angle of lag substantially equal to zero, so that the maximum forward conversion output voltage is produced.

It is now assumed that the thyristors U and Z are conductive in the thyristor converter 1. Then, when the transistor 4 is turned on, the line voltage $e_R - e_T (>0)$ of the AC power source is applied to the inductive elements 2R and 2T through the phase R of the power source, the inductive element 2R, the thyristor U, the diode 3, the transistor 4, the thyristor Z, the inductive element 2T and the phase T of the power source, so that the current flowing through the above-mentioned path rises. During this rise, the discharge of the smoothing capacitor 7 through the transistor 4 which is now conductive is interrupted by the diode 5, so that the smoothing capacitor 7 discharges only toward the voltage type inverter 8.

When the current reaches to a predetermined upper limit so that the transistor 4 is turned off, then a current is forced to flow into the smoothing capacitor 7 by the energy stored in the inductive elements 2R and 2T, even if the above-mentioned line voltage is lower than the voltage V7 across the smoothing capacitor 7. As a result, the current which flows through the phase R of the power source, the inductive element 2R, the thyristor U, the diode 3, the smoothing capacitor 7, the diode 5, the thyristor Z, the inductive element 2T and the phase T of the power source drops while charging the smoothing capacitor 7.

When the current reaches a predetermined lower limit, the transistor 4 is again turned on, so that the current rises again.

The above-described operation is repeated, so that the voltage across the smoothing capacitor 7 can be maintained at a level higher than the maximum forward conversion output voltage derived from the thyristor converter 1, while limiting the value of the current. Therefore, in case of driving the motor 9, the transistor 4 functions as a boosting or step-up chopper. The voltage type inverter 8 inverts the voltage across the smoothing capacitor 7 into an AC voltage having a variable voltage and a variable frequency. The AC voltage is in turn supplied to the motor 9.

In the case of the braking operation by the motor, the output frequency of the voltage type inverter 8 is decreased to a frequency lower than the frequency of the rotation of the motor 9, so that a slip frequency is made negative. Under this condition, the braking operation is performed.

As a result, the motor 9 now functions as a generator, so that the energy of rotation is converted into an electrical energy which in turn is returned to the smoothing capacitor 7 through the voltage type inverter 8. As a consequence, the voltage across the smoothing capacitor 7 rises. If this voltage exceeds a predetermined level, a voltage monitor (not shown) issues a command for switching the thyristor converter 1 to a control mode for the braking operation by the motor 9. This command can be generated in advance in accordance with a command signal for starting the braking operation by the motor 9.

In response to such a command signal, the thyristor converter 1 is switched to an operation at a predetermined minimum control angle of lead $\beta_{min}$ and generates a maximum reverse conversion output voltage having a polarity, which is opposite that in the case of the driving operation, on the DC side. This maximum reverse conversion output voltage is lower than the voltage across the smoothing capacitor 7.

One of the transistors 4 and 6, for instance, the transistor 6, is maintained continuously in the conduction state, while, the other transistor, for instance, the transistor 4, is driven to carry out a high frequency switching operation. In this case, it is assumed that the thyristors Z and U are turned on in the thyristor converter 1.

The voltage across the smoothing capacitor 7 is higher than the DC voltage derived from the thyristor converter 1, so that a regenerated current flows into the power source through the smoothing capacitor 7, the transistor 4, the thyristor Z, the inductive element 2T, the phase T of the power source, the phase R of the power source, the inductive elements 2R, the thyristor U, the transistor 6 and the smoothing capacitor 7 while the transistor 4 is conductive. In other words, the regenerated current is discharged from the smoothing capacitor 7.

Under this condition, the regenerated current keeps rising, so that when the regenerated current reaches a predetermined upper limit, the transistor 4 is turned off. As a result, due to the energy stored in the inductive elements 2T and 2R, the regenerated current returns to flow through the inductive element 2T, the phase T of the power source, the phase R of the power source, the inductive element 2R, the thyristor U, the transistor 6, the diode 5, the thyristor Z and the inductive element reactor 2T and thus the regenerated current drops.

When the regenerated current drops below a predetermined lower limit, the transistor 4 is again turned on. The turning on and off operation is repeated as described above, so that the regenerated current is returned to the power source while the current value is maintained within a predetermined range and the voltage across the smoothing capacitor 7 is maintained at a desired level. In this case, the turning on-off operation of the transistor 4 is a so-called step-down chopper operation.

The step-up chopper operation in the case of driving operation and the step-down chopper operation in the case of the braking operation by the high frequency switching operation of the transistor 4 can be carried out by, for instance, establishing a voltage control loop for the smoothing capacitor 7 having a current limiting loop as a minor loop for controlling an instantaneous current value.

The above-described step-up and step-down chopper operations can be also attained in principle by simultaneously turning on and off the transistors 4 and 6. Alternatively, in order to make the losses due to the transistors 4 and 6 uniform, the functions of the transistors 4 and 6 may be alternately changed at a predetermined time interval.

The inductive elements 2R, 2S and 2T have a function of limiting a variation rate of the current when the transistors operate in a chopper operation of the transistors, and they may be conventional AC inductive elements which enable communication of the thyristor converter 1. Consequently, it is not necessary to add the inductive elements 2R, 2S and 2T specially to such existing reactors. Alternatively, the reactors functioning to limit the variation rate of the current can be connected in series only to the DC side of the thyristor converter 11 or connected in series to both the sides of the thyristor converter 1.

Figure 2:
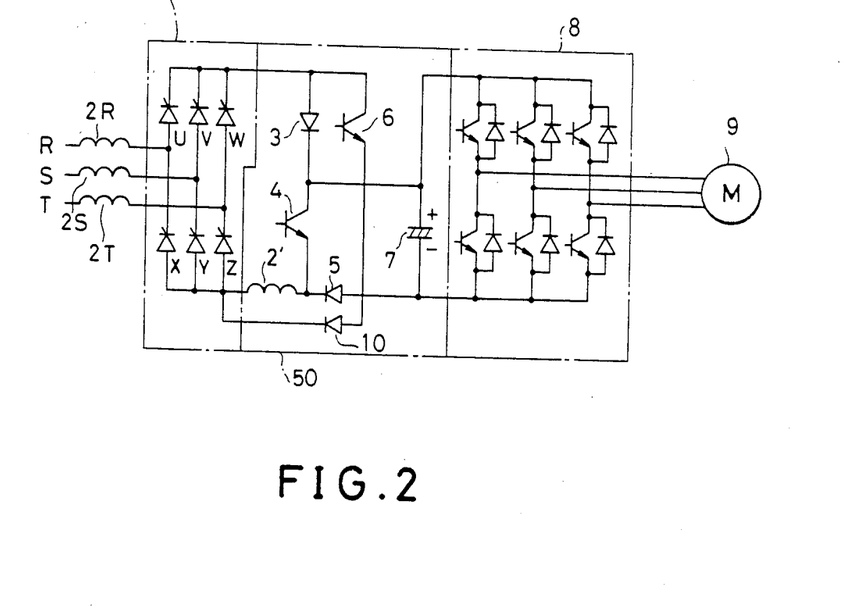
FIG. 2 is a circuit diagram showing another embodiment of a power converter in accordance with the present invention.

FIG. 2 shows another embodiment of the present invention in which a inductive element 2' capable of limiting the current variation rate is additionally inserted in series into the DC side of the thyristor converter 1. When no step-up chopper operation is carried out in the case of driving the motor 9, a current hardly flows through the reactors 2', if an additional diode 10 is added in a manner that the diode 10, bridges the inductive element 2' and the diode 5 (or only the inductive element 2'). As a result, the efficiency can be improved to some extent.

FIG. 3 shows a further embodiment of the present invention including an arrangement of control units. The portions 1-9 in the main circuit substantially correspond to those described above with reference to FIG. 1.

In FIG. 3, reference numeral 31 denotes a tachometer such as a pulse encoder coupled to, the rotating shaft of the motor 9 for detecting a rotational speed of the motor 9. Reference numeral 32 denotes a setting device, for example, a potentiometer for presetting a set point N* of the rotational speed. The rotational speed detection signal derived from the tachometer 31 and the preset rotational speed derived from the rotational speed setting device 32 are applied to a control circuit or vector controller 33 which controls turning on and off the respective transistors in the inverter 8 to control a magnitude and a frequency of the output voltage from the inverter 8, so that the rotational speed of the motor 9 coincides with the preset rotational speed N*. For this control circuit 33, use can be made of various conventional circuits which are well known in the art of varying a rotational speed of an AC motor such as FRENIC 5000 series control circuit manufactured by Fuji Electric Co., Ltd. or a control circuit disclosed in FIG. 4 on page 277, Vol. 58, No. 4, of "FUJI ELECTRIC JOURNAL". A DC voltage detector 34 connected in parallel to both terminals of the smoothing capacitor 7 has a comparison function for judging whether or not the voltage Ec across the smoothing capacitor 7 is greater than a predetermined voltage $E_{CM}$. A logic signal or a selector control signal derived from the DC voltage detecting circuit 34 in response to the above-mentioned comparison is applied to a control circuit 35 for controlling the thyristor converter 1 and to a control circuit 36 for controlling the transistors 4 and 6.

The control circuit 35 receives voltages detected from the three phases R, S and T of the AC power source as synchronizing signals for giving a reference point of a firing phase angle, and in accordance with the selector control signal from the DC voltage detector 34, the control circuit 35 controls the thyristor converter 1 at a minimum control angle of lag $\alpha_{min}$ (=0) or a maximum control angle of lag $\alpha$ max (i.e., a minimum control angle of lead $\beta_{min}=180°-\alpha_{max}$). That is, when the voltage Ec across the smoothing capacitor 7 is lower than the predetermined voltage $E_{CM}$, the thyristor converter 1 is operated at the minimum control angle of lag $\alpha_{min}$ to generate the maximum forward conversion output (that is, this operation is substantially similar to that of the diode rectifier), and when the voltage Ec across the smoothing capacitor 7 is higher than the predetermined voltage $E_{CM}$, the thyristor converter 1 is operated at the minimum control angle of lead $\beta_{min}$ so that the maximum reverse conversion output is obtained.

Figure 4:
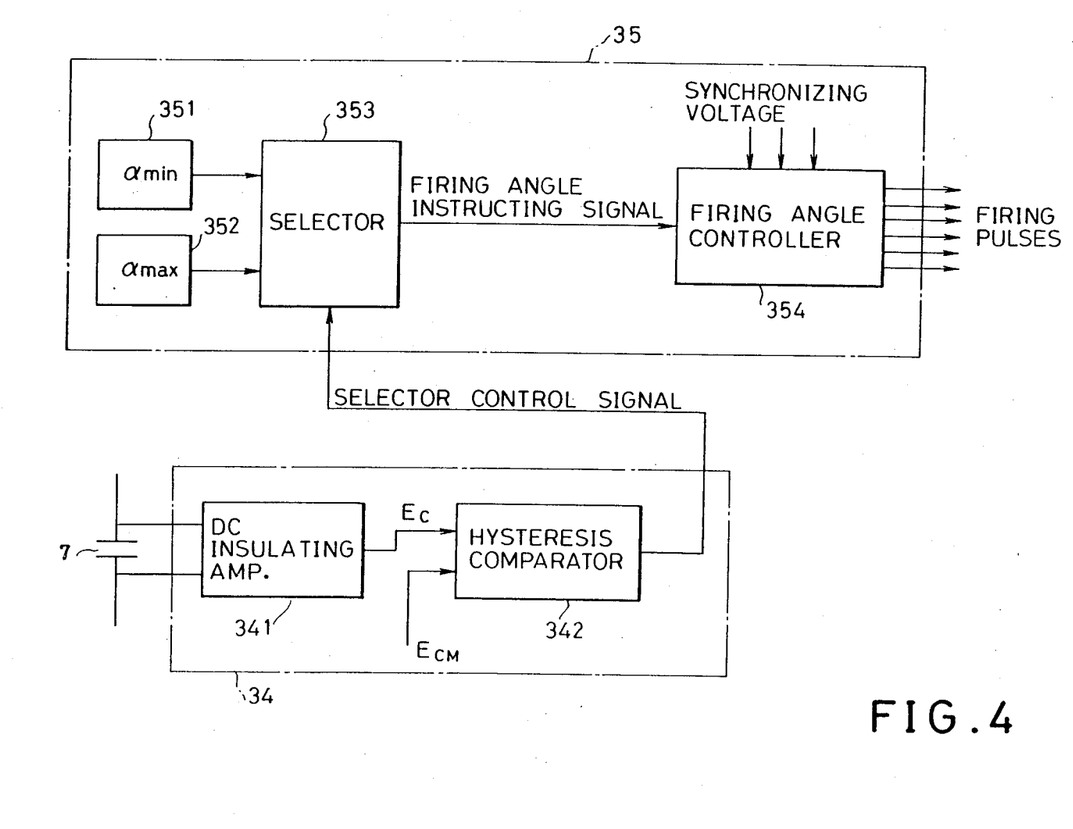
FIG. 4 is a block diagram showing a specific embodiment of the control circuits 34 and 35 shown in FIG. 3.

Specific embodiments of the DC voltage detector 34 and the control circuit 35 are shown in detail in FIG. 4.

The DC voltage detector 34 has a DC insulating amplifier 341 for amplifying the voltage $V_7$ across the smoothing capacitor 7 and a hysteresis comparator 342 for comparing the output Ec from the amplifier 341 with the predetermined value $E_{CM}$. The selector control signal is derived from the comparator 342.

The control circuit 35 has a setting circuit 351 such as a potentiometer for setting the minimum control angle of lag $\alpha_{min}$, another setting circuit 352 such as a potentiometer for setting the minimum control angle of lead $\beta_{min}$, a selector 353 for outputting as a firing angle command signal the output signal set by the setting circuit 351 or 352, and a firing angle controller 354 which receives the AC voltages from the AC power source phases R, S and T as synchronizing voltages and produces firing trigger pulses to the respective thyristors U-Z of the thyristor converter 1 in accordance with the firing angle command signal from the selector 353.

In addition to the selector control signal from the DC voltage detector 34, the control circuit 36 receives the input signal representative of the current limit set value I* set by the setting device 37 and the current detection signal from a current transformer 38 inserted into the DC side of the thyristor converter 1. When the voltage Ec across the smoothing capacitor 7 is lower than the predetermined voltage $E_{CM}$, the control circuit 36 keeps both the transistors 4 and 6 interrupted by the logic signal outputted from the DC voltage detector 34. When the voltage Ec across the smoothing capacitor 7 becomes higher than the predetermined voltage $E_{CM}$, one of the transistors, for instance the transistor 4, is kept in a continuously conductive state, while the other transistor, for instance, the transistor 6 is so controlled to be turned on and off. This turning on-off control is accomplished in such a way that the current I detected by the current transformer 38 is limited to the limit set value I*.

Therefore, in the case of driving the motor 9, the thyristor converter 1 generates the maximum forward conversion output voltage substantially equal to that generated by a diode rectifier and the voltage across the smoothing capacitor 7 has a voltage also substantially equal to this maximum forward conversion output voltage. When the motor 9 is operated in the braking mode, the voltage Ec across the smoothing capacitor 7 rises in accordance with the electrical power returned to the capacitor 7 from the motor 9 through the inverter 8. If the voltage Ec across the capacitor 7 exceeds the predetermined voltage $E_{CM}$, the thyristor converter 1 is switched to the maximum reverse conversion operation, so that the transistors 4 and 6 are controlled in the manner described above, whereby the power regeneration to the AC power source is performed under the condition of a limited current, and consequently the voltage Vc across the smoothing capacitor 7 is limited to a value in the vicinity of the predetermined voltage $E_{CM}$.

Figure 5:
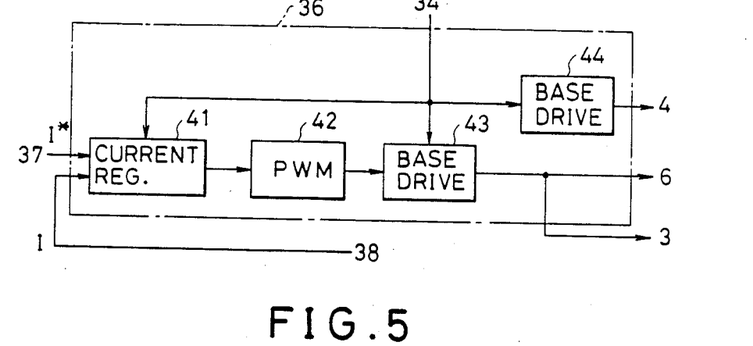
FIGS. 5 and 6 are block diagrams showing two embodiments, respectively, of the control circuit 36 shown in FIG. 3.
Figure 6:
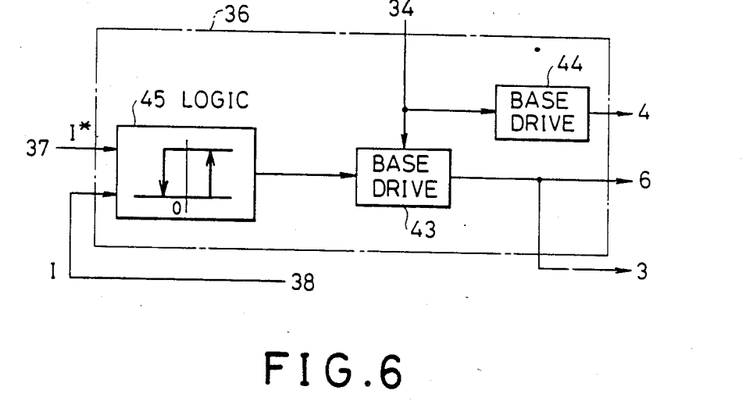

FIGS. 5 and 6 show two embodiments of the control circuit 36 shown in FIG. 3.

In the embodiment shown in FIG. 5, the current limit set value I* derived from the setting device 37 such as a potentiometer shown in FIG. 3 and the actual current value I detected by the current transformer 38 are supplied to a current regulator 41. The current regulator 41 executes proportional integration of the current control deviation (I* - I) to generate a control signal to be applied to a pulse width modulator 42. In response to a PWM signal derived from the pulse width modulator 42, a base drive circuit 43 controls the turning on and off of the transistor 6. In addition, the logic signal from the DC voltage detector 34 shown in FIG. 3 is applied to the current regulator 41, the base drive circuit 43 and another base drive circuit 44 for the transistor 4. When the voltage Ec across the smoothing capacitor 7 is lower than the predetermined voltage $E_{CM}$, the logic signal derived from the DC voltage detector 34 is applied as a zero-hold signal to the current regulator 41 and is also applied to the base drive circuits 43 and 44 as an output disabling signal. When the voltage Vc across the smoothing capacitor 7 exceeds the predetermined value $E_{CM}$, the logic signal derived from the DC voltage detector 34 releases the zero-hold of the current regulator 41 and enables the output signals from the base drive circuits 43 and 44.

Further, the output signal derived from the base drive circuit 43 can be also applied to the control circuit 35, so that when the firing trigger pulse applied to each of the respective thyristors in the converter 1 from the control circuit 35 is a so called "double pulse", an additional pulse is applied to a thyristor which is in the conduction state in the thyristor converter 1 when the transistor 4 is enabled, thereby ensuring the establishment of the current. The control line 39 extended from the control circuit 36 to the control circuit 35 is provided for this purpose. However, when the firing trigger pulse applied to each of the thyristors U-Z in the thyristor converter 1 is a pulse having a pulse duration substantially equal to 120°, the control line 39 can be eliminated.

Figure 7:
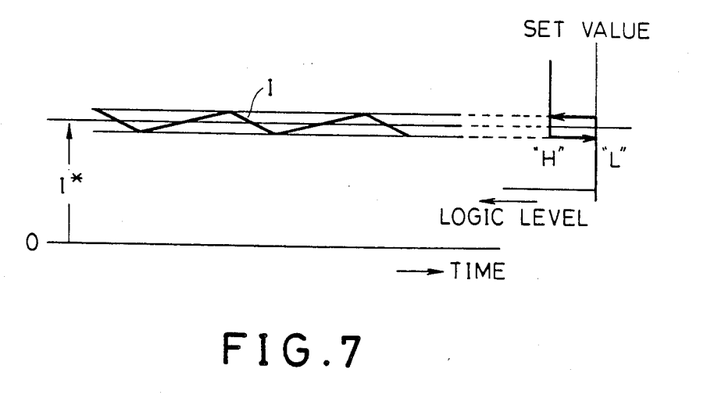
FIG. 7 is a time chart used to explain operations of the embodiment shown in FIG. 6.

In a modification shown in FIG. 6, the current regulator 41 and the pulse width modulator 42 shown in Fig. 5 are replaced by a hysteresis comparator 45. In this case, as shown in FIG. 7, the current I reciprocates between an upper limit and a lower limit defined above and below the limit set value I*, respectively.

Figure 8:
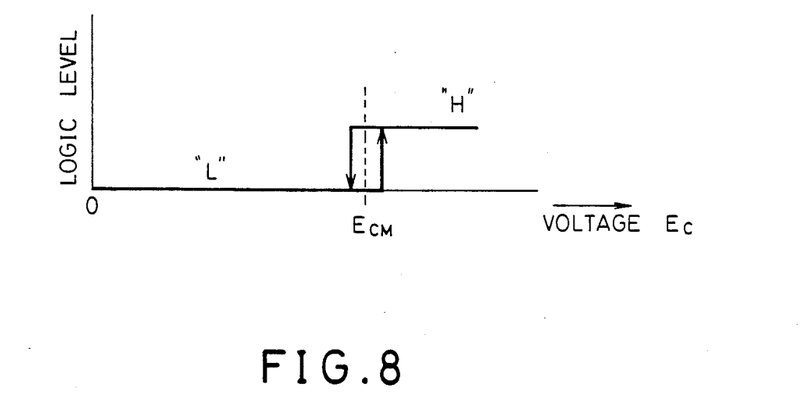
FIG. 8 illustrates an input and output characteristic curve in the DC voltage detection circuit 34 shown in FIG. 3.

An input and output characteristic of the DC voltage detector 34 shown in FIG. 1 preferably has a hysteresis as illustrated in FIG. 8. FIG. 8 shows logic levels "H" and "L" of the logic output signal from the DC voltage detector 34 with respect to the voltage Ec across the smoothing capacitor 7.

As described above, the combination of the two diodes 4 and 6 and the two semiconductor switches 3 and 5 has not only the function of switching the connection polarities of the thyristor converter 1 and the smoothing capacitor 7 in a contactless or electronic manner but also the function of regulating the voltage across the smoothing capacitor with a limited current by the voltage step-up or step-down chopper operation by the semiconductor switch 4 or 6.

The availability of the thyristor converter 1 is high, because the thyristor converter 1 is selectively operated at the predetermined maximum forward conversion output voltage or the maximum reverse conversion output voltage. Contrary to the prior art, the present invention uses no resistor, and when the motor is used in the braking mode, while the regenerated current can be limited within a desired range, the regenerated current is returned to the power source in a safe and efficient manner in accordance with the high frequency switching operations of the semiconductor switches.

In addition, since no resistor is used in the present invention, it is not needed to consider the heat dissipation from the resistor.

Accordingly, the power converter can be designed and constructed compact in size, light in weight and inexpensive to manufacture.

The invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A power converter for driving an AC motor at a variable speed, comprising:
   a thyristor converter connected to an AC power source for rectifying an AC voltage from said AC power source; said thyristor converter having first and second DC terminals;
   a DC intermediate circuit including a smoothing capacitor for charging therein a rectified output from said thyristor converter, a first diode, a second diode, a first semiconductor switch, a second semiconductor switch; said smoothing capacitor having first and second terminals; said first and second DC terminals of said thyristor converter being respectively connected to said first and second terminals of said smoothing capacitor through said first and second diodes, respectively, in a polarity relationship corresponding to forward conversion by said thyristor converter during driving of said AC motor; and during braking operation of said AC motor, said first and said second DC terminals of said thyristor converter being respectively connected to said first and said second terminals of said smoothing capacitor through said first and second semiconductor switches, respectively, in a polarity relationship corresponding to reverse conversion by said thyristor converter, whereby during driving of said AC motor, one of said first and second semiconductor switches is turned off, while the other one of said first and second semiconductor switches is caused to perform a high frequency switching operation or both of said first and second semiconductor switches are simultaneously interrupted; and during braking operation, one of said first and second semiconductor switches is rendered conductive while the other one of said first and second semiconductor switches is caused to perform a high frequency switching operation; a voltage type inverter having two terminals respectively connected to two terminals of said smoothing capacitor for inverting a DC voltage across said two terminals of said smoothing capacitor into an AC voltage having a variable frequency and a variable voltage, said AC voltage being supplied to said AC motor;
   A control means for operating said thyristor converter substantially at a predetermined maximum forward conversion output voltage during driving of said AC motor, and for operating said thyristor converter substantially at a predetermined maximum reverse conversion output voltage during braking operation of said AC motor; and
   an inductive element disposed in series with at least one of the AC and DC sides of said thyristor converter.

2. A power converter as claimed in claim 1, wherein one terminal of said first diode and one terminal of said first transistor are connected to each other, and one terminal of said second diode and one terminal of said second transistor are connected to each other; the other terminal of said first diode and the other terminal of said second transistor are connected to each other and in common to one terminal of said thyristor converter, and the other terminal of said first transistor and the other terminal of said second diode are connected to each other and in common to the other terminal of said thyristor converter; and said smoothing capacitor is connected between said one terminal of said first diode and said one terminal of said second diode.

3. A power converter as claimed in claim 1, wherein one terminal of said first diode and one terminal of said first transistor are connected to each other, and one terminal of said second diode and one terminal of said second transistor are connected to each other; the other terminal of said first diode and the other terminal of said second transistor are connected to each other and in common to one terminal of said thyristor converter, and the other terminal of said first transistor and the other terminal of said second diode are connected to each other and in common to the, other terminal of said thyristor converter through an inductive element; and said smoothing capacitor is connected between said one terminal of said first diode and one terminal of said second diode.

4. A power converter as claimed in claim 3, further comprising a third diode connected between said one terminal of said second diode and the other terminal of said thyristor converter.

5. A power converter as claimed in claim 1, wherein said control means comprises:
means for detecting an output current from said thyristor converter;
means for supplying a set value for the output current from said thyristor converter;
means for comparing the detected output current with said set value; and
current control means for controlling said first and second semiconductor switches in response to a comparison output signal from said means for comparing such that operations of said first and second semiconductor switches are interrupted when said detected output current is lower than said set value, and that the operations of said first and second semiconductor switches are enabled when said detected output current exceeds said set value, whereby said output current coincides with said predetermined value.

6. A power converter as claimed in claim 5, wherein said current control means includes a hysteresis comparator which receives said comparison output from said means for comparing and limits said output current within a range between a predetermined upper limit and a predetermined lower limit with respect to said set value.

7. A power converter as claimed in claim 5, wherein said current control means comprises:
means for executing proportional integration of said comparison output from said means for comparing; and
a pulse width modulation means for generating a pulse output having a pulse width which varies in accordance with a result of said proportional integration, said first and second semiconductor switches being connected to and controlled by said pulse output.

8. A power converter as claimed in claim 1, further comprising:
means for detecting whether or not the voltage across said smoothing capacitor exceeds a predetermined value; and
means for controlling said thyristor converter so that said thyristor converter is switched to motor braking operation when said voltage across said smoothing capacitor exceeds said predetermined value.

9. A power converter as claimed in claim 8, wherein said means for detecting has a hysteresis characteristic between a predetermined upper limit and a predetermined lower limit with respect to said predetermined value.

* * * * *